Figure 1:
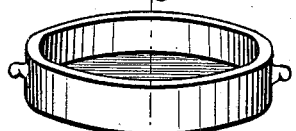
Figure 2:
Figure 3:
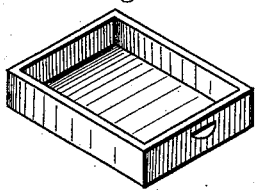
Figure 4:
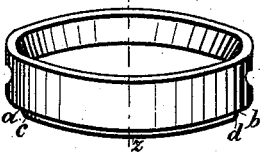
Figure 5:
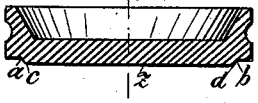
Figure 6:
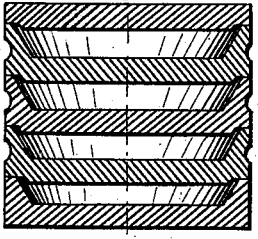
Figure 7:
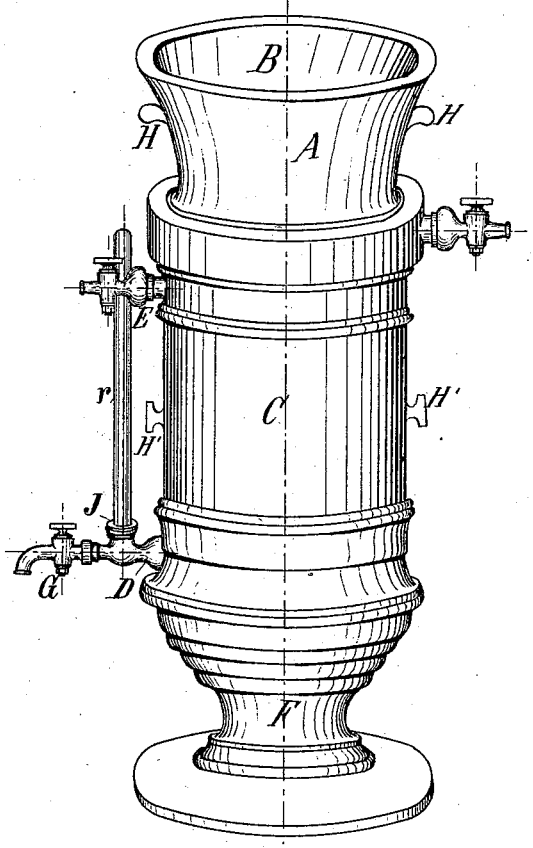
Figure 8:
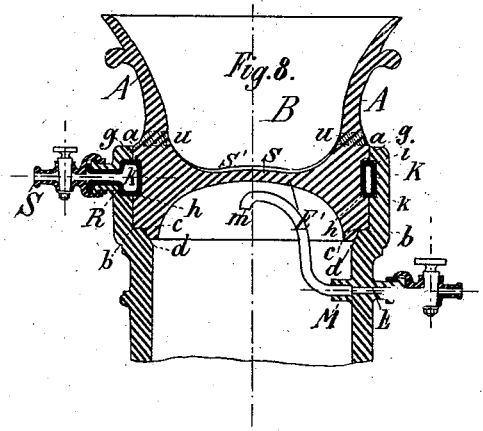
Figure 19:
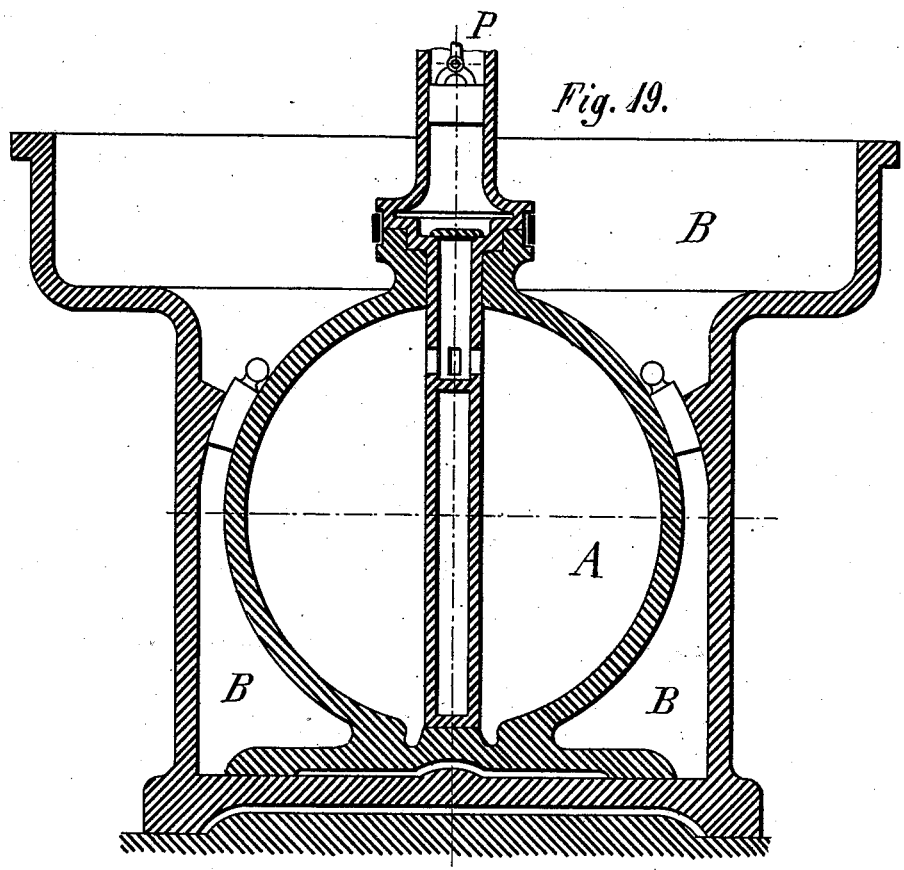
Figure 20:
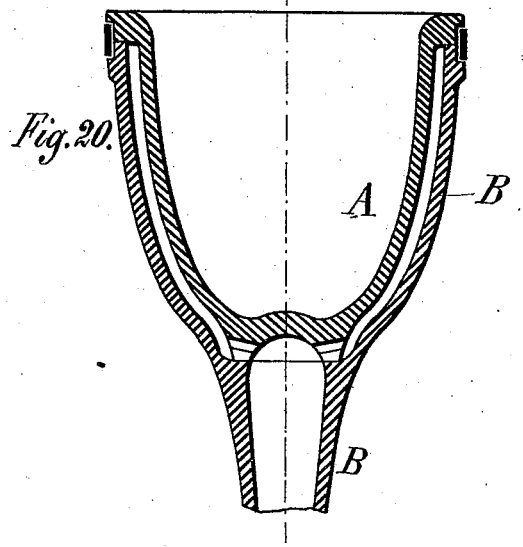

(No Model.)  4 Sheets—Sheet 1.

G. PRAETORIUS.

Preparing Clay to obtain Porous and Slagged Bodies.

No. 235,961.  Patented Dec. 28, 1880.

Witnesses:
Wm. Lyons
Henry Van Blarcom

Inventor.
Georg Praetorius
per Beery & Roeder
Attorney

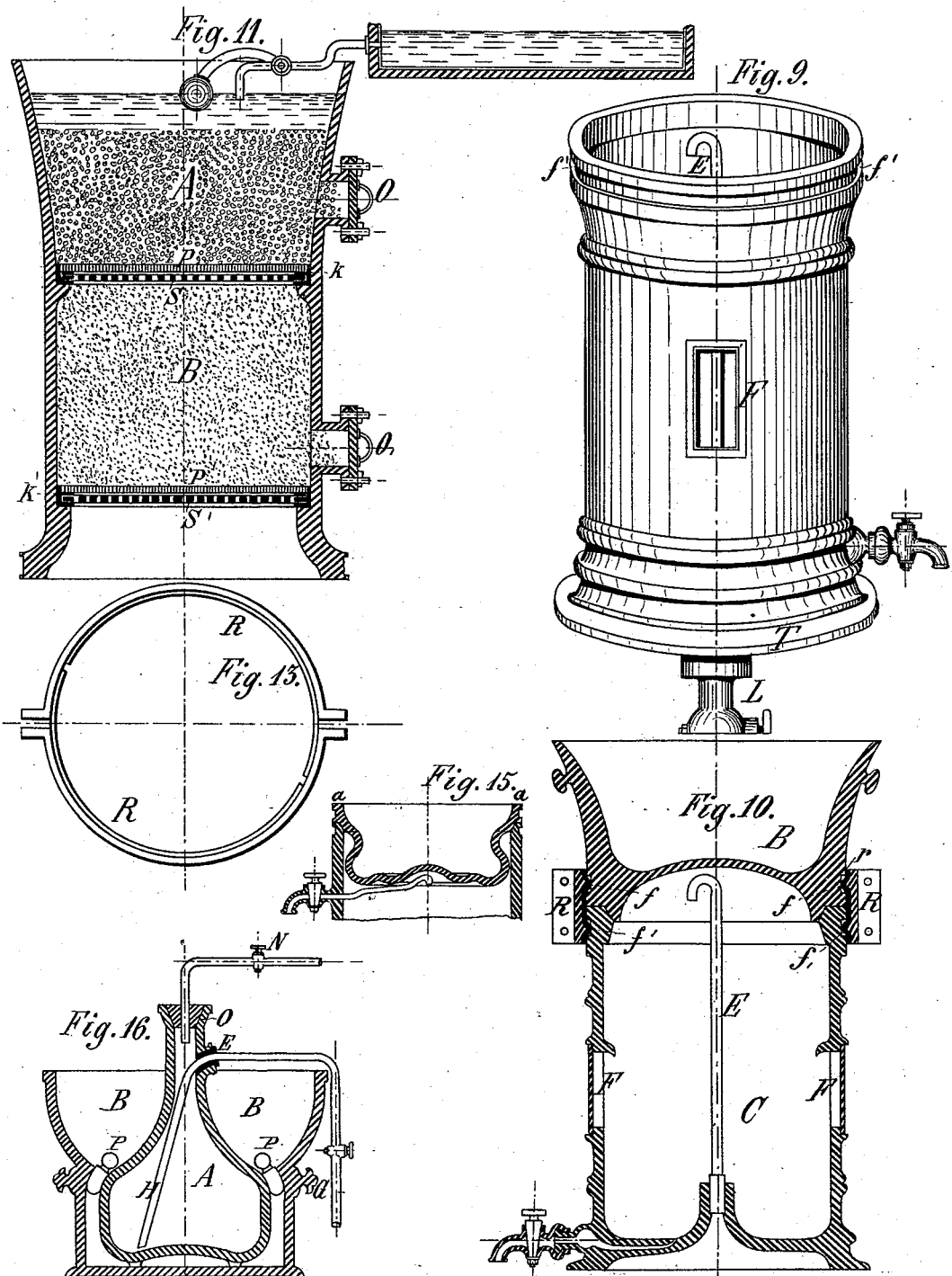

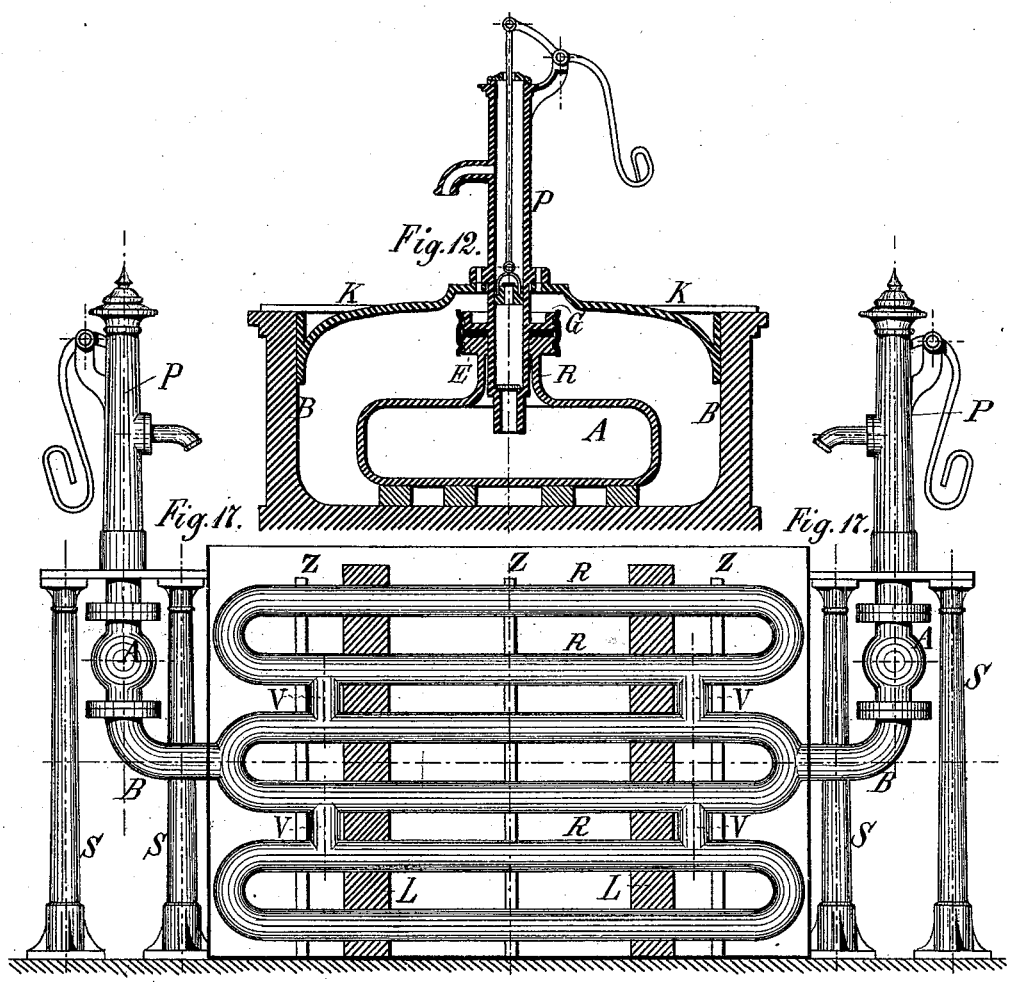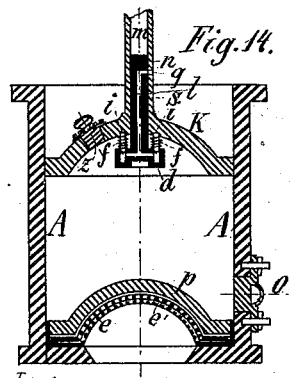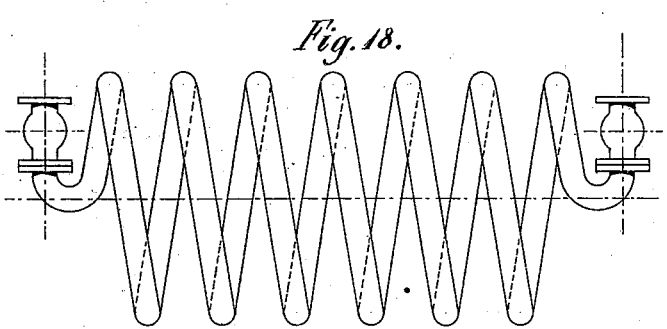

G. PRAETORIUS.
Preparing Clay to obtain Porous and Slagged Bodies.
No. 235,961. Patented Dec. 28, 1880.

UNITED STATES PATENT OFFICE.

GEORG PRAETORIUS, OF BRESLAU, PRUSSIA, GERMANY.

PREPARING CLAY TO OBTAIN POROUS AND SLAGGED BODIES.

SPECIFICATION forming part of Letters Patent No. 235,961, dated December 28, 1880.

Application filed May 20, 1880. (No model.) Patented in Belgium October 29, 1879.

*To all whom it may concern:*

Be it known that I, GEORG PRAETORIUS, of Breslau, Province of Silesia, Kingdom of Prussia, Empire of Germany, have invented a new and useful Method of Preparing Clay for Porous Earthenware, of which the following is a specification.

My object is to prepare porous earthenware suitable for use in filtering, absorption, and various kinds of chemical treatment. To avoid injury by acids, I employ clay which is free from iron, lime, or any of their compounds, although, when the vessel is to be used for filtering only, the absence of these substances is not important. I next subject a quantity of powdered charcoal to the action of muriatic acid. I then add to a mass of the clay thirty-three and one-third per cent. of the charcoal thus treated, and knead the mixture thoroughly. When the vessel is to be used for absorption, the proportion of charcoal may be increased to seventy-five per cent. I then add to the mixture, to insure hardness, ten or twelve per cent. of fluor-spar and about the same proportion of Norwegian feldspar. This will insure a certain vitreous quality in the surface of the vessel and prevent it from being disfigured by accidental scratching. I then shape the vessel in any convenient manner known to potters and workers in earthenware. I then burn or "fire" it, so as to harden it in shape, changing the soft clay to earthenware, employing a sufficient degree of heat to eliminate the charcoal and leave only the slagged porous clay. This last operation is effected in chills when the vessel is to be used for chemical purposes, and in an oven when the vessel is intended for filtering. In the former case the flame is not allowed to reach the vessel. In the latter case charcoal is used as fuel, or else the vessel is covered with a coat of charcoal-dust and clay, which is shaved off after burning.

When it is desired that certain parts of the vessel shall not be porous, those parts are made of ordinary clay and glazed, or a partial glazing of certain parts may be effected by dipping them into oil.

The figures of my drawings represent numerous articles, vessels, and apparatus which may be made wholly or partly from clay thus prepared; but, as they illustrate some of the applications of my invention rather than the invention itself, a detailed description of these devices is unnecessary.

For filtering purposes I also employ small fragments of clay, treated as hereinbefore described, and acting in the well-known manner of small pieces or particles arranged in layers. Such fragments may also be prepared by plastering a mixture of clay and charcoal on fibrous material, burning out the charcoal and fibrous material, and crushing the residue.

Instead of feldspar and fluor-spar, kaolin or other suitable materials may be employed for giving a hard surface, as hereinbefore stated.

Having thus described my invention, what I claim as new, and desire to secure by Letters Patent, is—

The process of manufacturing porous earthenware, consisting, first, in subjecting powdered charcoal to the action of muriatic acid, then mixing the same, thus treated, with pure clay, then adding to the mixture about ten per cent. of fluor-spar and an equal amount of feldspar, then shaping the mixture into earthenware articles, and finally burning out the charcoal by heat derived from charcoal flame or flame which does not reach the earthenware, substantially as set forth.

In testimony whereof I have signed this specification in the presence of two subscribing witnesses.

DR. GEORG PRAETORIUS.

Witnesses:
  HERMANN KÜHN,
  HUGO NEUMANN.